(No Model.)
L. S. GROVES.
APPARATUS FOR GENERATING AND CARBURETING HYDROGEN GAS.
No. 298,462. Patented May 13, 1884.
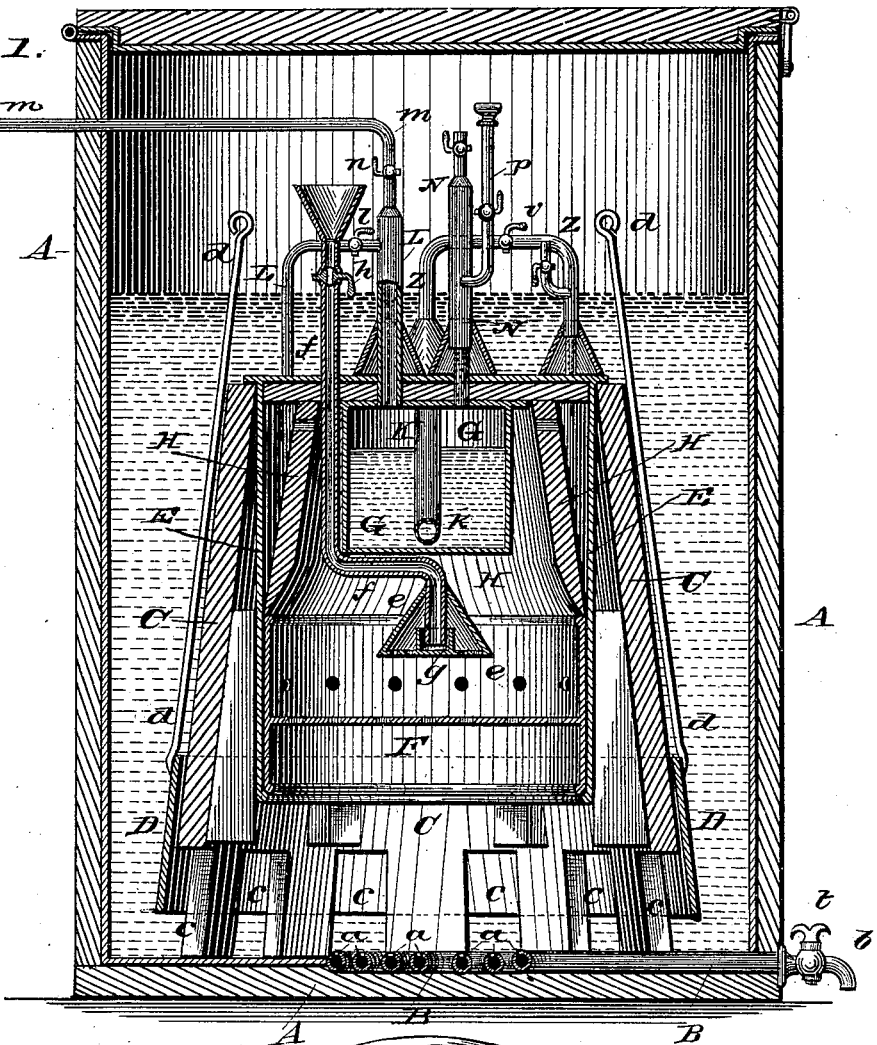
Fig. 1.
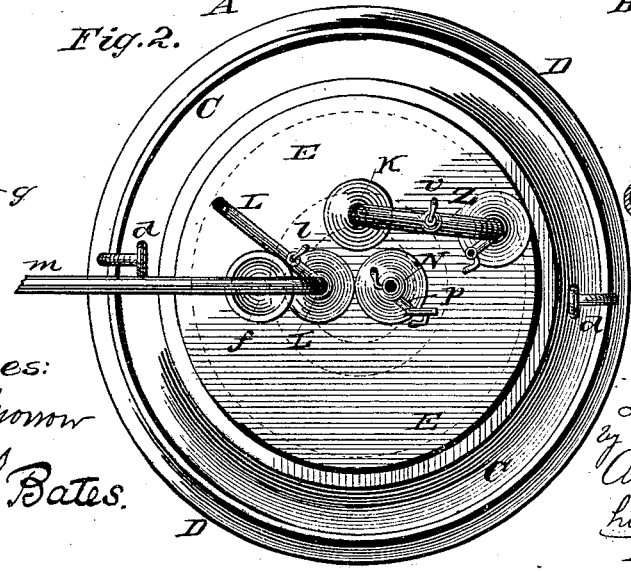
Fig. 2.
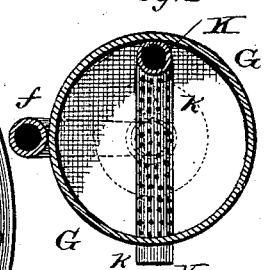
Fig. 3.
Fig. 4.
Witnesses:
John T. Morrow
Emory H. Bates
Inventor:
L. S. Groves
by Anderson Smith
his Attorneys.

UNITED STATES PATENT OFFICE.

LEROY S. GROVES, OF AFTON, IOWA, ASSIGNOR TO JOSHUA F. BISHOP, OF SAME PLACE, AND J. H. PATT, OF CRESTON, IOWA.

APPARATUS FOR GENERATING AND CARBURETING HYDROGEN GAS.

SPECIFICATION forming part of Letters Patent No. 298,462, dated May 13, 1884.

Application filed June 23, 1883. (No model.)

*To all whom it may concern:*

Be it known that I, LEROY S. GROVES, a citizen of the United States, residing at Afton, in the county of Union and State of Iowa, have invented certain new and useful Improvements in Apparatus for Generating and Carbureting Hydrogen Gas; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my device. Fig. 2 is a plan view, and Figs. 3 and 4 are detail views.

This invention has relation to apparatus for generating and carbureting hydrogen gas; and it consists in the construction and novel arrangement of devices, all as hereinafter set forth, and pointed out in the appended claims.

In the accompanying drawings, the letter A designates the outer case or vessel, in which the acidulated water is held. In the bottom of the vessel A is located a convoluted or coiled pipe, B, which is provided with inlet perforations $a$, and terminates in a spout, $b$, which extends through the wall of the case. This spout is provided with a faucet, and serves to enable the inert copperas-water to be drawn off from time to time.

C represents an inner incasement of wood, having an open bottom, in which marginal ways $c$ are formed, which may be closed, when desirable, by means of an annular gate, D, surrounding the lower portion of the incasement or jacket C, and having upwardly-extending handles $d$, whereby it may be raised or lowered, according to requirement. When the inert copperas-water is to be drawn off, the annular gate is shut down, in order to prevent, as far as possible, the waste of the acidulated water in the vessel A, which, being lighter than the copperas-water, does not intermix therewith to any important degree. Within the upper portion of the case C is the chamber E, in which is generated hydrogen gas from iron filings or clippings of zinc placed in a basket, F, in the lower part of said chamber. Within the upper portion of the chamber E is the gasoline-chamber G, which is surrounded by a wooden jacket or skirt, H, within the hydrogen-gas chamber E. Below the gasoline-chamber G is an expanded discharge-chamber, $e$, having a perforated base, and the tube $f$, communicating with said chamber, extends upward for the introduction of pure water to cleanse the filings or clippings in the basket F below the perforated discharge-chamber $e$. The lower end of the tube $f$ is arranged within a cup, $g$, in the chamber $e$, which is designed to remain full of water, and when the check-valve $h$ in the tube $f$ is closed that portion of the tube between the check-valve and the cup is kept full of water. In this manner the weight of a column of water is always provided to facilitate the introduction of a supply of water against a heavy pressure of gas from the hydrogen-chamber.

K represents a tube, which carries the hydrogen gas over from the hydrogen-chamber E to the gasoline-chamber G. The discharging portion $k$ of this tube is horizontally arranged at the bottom of the gasoline-chamber, and is perforated with a number of small apertures, whereby the gas is emitted in a subdivided manner instead of by single bubbles through the gasoline. The object of this construction is to obviate unsteadiness in the flame at the burners.

L represents a tube, one end of which communicates with the hydrogen-chamber, while its other end opens into the top of the gasoline-chamber. This tube is provided with a check-valve at $l$. Usually one branch, $m$, of this tube is made to serve for the supply-tube of the gasoline-chamber, and is provided with a check-valve at $n$. The object of the tube L is to set up a communication between the hydrogen-chamber and the gasoline-chamber. After shutting off the gas at the burners, the high temperature in the hydrogen-chamber continues, owing to the action of the chemicals therein, and the gasoline-vapor is expanded thereby, so that there is danger of bursting the gasoline-tank; but by opening the check-valve $l$ in the tube L the gasoline-vapor is allowed to pass over, so that the pressure is equalized.

N represents the main vent-pipe for the carbureted or illuminating gas, having such branches as may be necessary to extend to the burners. This vent-pipe is provided with a small branch, p, having a check-valve and burner, and serving to provide a light at the apparatus, when necessary to inspect the same in the night-time.

Z represents an extension of the tube K, having a check-valve at v. To a nozzle of the extension Z may be attached small tubing to convey the gasoline from the gasoline-chamber into the reservoir of a gasoline-stove when needed for use in cooking or for other purposes. This is accomplished when the apparatus is not in use for illuminating purposes by changing the direction of pressure on the gasoline in the chamber G, opening the check-valve l in the pipe L, so that the pressure of the hydrogen is upon the top of the gasoline, and at the same time closing the check-valve v in the pipe K.

The object of the inner jacket or skirt, H, of wood, which surrounds the gasoline-chamber, is to utilize the heat set up by the action of the chemicals below, and to counteract the condensing tendency of the acidulated water when cold, so that the gasoline is raised to the proper temperature for vaporization. The larger wooden incasement, C, outside of the hydrogen-chamber, is designed to assist in this effect.

When it is desired to produce illuminating-gas, the vent l is opened, so that the acidulated water is allowed to rise in the hydrogen-chamber E until it reaches the filings or clippings in the basket F. Then the vent is closed, and the chemical action sets free the hydrogen gas, which passes over into the gasoline-chamber, and is enriched by taking up the gasoline-vapor, as hereinbefore stated. When the escape of the hydrogen gas is stopped—as, for instance, when it is shut off at the burners—the hydrogen-chamber, becoming filled with the gas, causes a descent of the acidulated water therein until it falls below the basket F, and being no longer in contact with the filings or clippings therein, the chemical action ceases. The apparatus is therefore self regulating.

Having described this invention, what I claim, and desire to secure by Letters Patent, is—

1. The inner wooden jacket or skirt surrounding the gasoline-tank within the upper portion of the hydrogen-chamber, substantially as specified.

2. The open-bottom wooden casing C, having marginal ways or notches in its lower edge, and surrounding the hydrogen-chamber, substantially as specified.

3. The adjustable annular gate extending around the incasement C, and adapted to close the ways or notches thereof, substantially as specified.

4. The combination, with the incasement C and its adjustable annular gate, of a coiled or convoluted and perforated waste-pipe, substantially as specified.

5. The combination, with the basket F, for holding the clippings of iron, of the cleansing device, consisting of the tube f, provided near its upper end with the check-valve h, and the expanded discharge-chamber e, having a perforated base and cup g, substantially as specified.

In testimony whereof I affix my signature in presence of two witnesses.

LEROY S. GROVES.

Witnesses:
  I. N. CHERRY,
  CHAS. BOTHE.